United States Patent [19]
Hudspeth

[11] 4,033,190
[45] July 5, 1977

[54] PRECISION MEASURING DEVICE

[76] Inventor: Henry S. Hudspeth, 12 Haley st., Pine Bluff, Ark. 71601

[22] Filed: Feb. 9, 1976

[21] Appl. No.: 656,698

[52] U.S. Cl. ............................................. 73/426
[51] Int. Cl.² ..................................... G01F 19/00
[58] Field of Search ............ 73/426, 429; 222/158; 23/292

[56] References Cited

UNITED STATES PATENTS

| 1,124,329 | 1/1915 | Rhodes | 73/429 X |
|---|---|---|---|
| 1,993,001 | 3/1935 | Geyer | 222/158 |
| 2,158,102 | 5/1939 | Betzold et al. | 222/158 |
| 2,510,159 | 6/1950 | Wiczer | 73/426 X |
| 3,094,245 | 6/1963 | Mizuno | 73/429 X |
| 3,145,876 | 8/1964 | McBrien | 222/158 X |
| 3,827,610 | 8/1974 | Stiefel, Jr. | 73/429 X |

Primary Examiner—Charles A. Ruehl
Assistant Examiner—Joseph W. Roskos

Attorney, Agent, or Firm—Clarence A. O'Brien; Harvey B. Jacobson

[57] ABSTRACT

A precision measuring device for accurately measuring large volumes of liquids which includes a primary measuring vessel having a predetermined overflow level together with an overflow saver vessel for the purpose of catching and saving any liquid above the desired measured amount. Primary valve means at the bottom of the primary measuring vessel allows for easy and complete discharge of said primary vessel after the measuring process takes place while a secondary valve between the overflow saver vessel and the primary vessel permits any excess liquid which has overflowed from the primary vessel into the saver vessel to be emptied into the primary vessel at the beginning of the next measuring operation. An additional displacement structure is also employed to permit accurate changes in measured amounts within the primary vessel. The primary vessel is also mounted on trunnions to permit rapid dumping of the measured contents when so desired.

10 Claims, 2 Drawing Figures

PRECISION MEASURING DEVICE

BACKGROUND OF THE INVENTION

1. Field of the Invention

This invention relates generally to volumetric measuring type devices for accurately measuring liquids in large quantities.

2. Description of the Prior Art

A common problem with known prior art measuring vessels is that they are not designed to accurately measure large quantities of liquid in a precision manner. It is quite common to have accurate measuring vessels for small prescription-type quantities and easily handled small measuring apparatus, but normally when it becomes important to measure large liquid volumes rough measurements within a few gallons is normally considered acceptable.

Another known problem with prior devices is that means for saving any overflow from the measuring vessel is not considered, or is not part of the over-all apparatus for measuring. When expensive liquids are being measured, this aspect becomes quite important. Also, in today's great concern for the ecology even with some liquids which in themselves are not too expensive nor valuable, it is important not to allow any excess or waste to be indiscriminately discarded because of the pollution factor. Therefore, it is important to have a measuring device which eliminates any overflow waste.

Another problem with known devices is that they do not provide ready means for changing the measuring capacity of the measuring apparatus in a predetermined and accurate manner.

Known prior art patents which may be pertinent to this invention are as follows:

U.S. Pat. No. 110,202 — Dec. 20, 1870 — Catlin
U.S. Pat. No. 1,461,486 — July 10, 1923 — Kishpaugh
U.S. Pat. No. 2,175,747 — Oct. 10, 1939 — Dodd
U.S. Pat. No. 3,094,245 — June 18, 1963 — Mizuno.

None of these known prior art devices offers the new and unique features of the invention disclosed herein.

SUMMARY OF THE INVENTION

An object of the present invention is to provide a precision liquid measuring apparatus for accurately measuring large volumes of liquid.

Another object of the present invention is to provide precision liquid measuring apparatus which permits any excess liquid over the desired measured amount to be saved for immediate or future use in the next or future measuring operation.

A further object of this invention is to provide a precision measuring system which permits easy discharge of the desired measured amount by several different ways. A valve may be provided for permitting discharge from the measuring vessel and/or the measuring vessel may be appropriately supported for easy dumping of the entire contents of said measuring vessel.

A still further object of this invention is to provide a precision measuring vessel having additional displacement means which are accurately calibrated to permit an accurate change in the amount of volume of the primary vessel so that lesser amounts of liquid may be accurately measured therewith.

A still further object of this invention is to provide a very large precision measuring apparatus which will very accurately measure extremely large quanitities of liquid with an overflow excess liquid saving feature to eliminate any waste of the liquid being measured and additionally including means for varying the amount of accurate volume of the primary measuring vessel.

An additional still further object of this invention is to eliminate any wastage or spillage from the measuring apparatus in order to eliminate any possible pullution from loss or wastage of excess liquid over the desired measured amount.

The precision measuring apparatus disclosed herein has many advantages over known measuring devices. A very important advantage of this device is that it permits extremely large quantities and volumes of liquids to be accurately measured.

Another important feature is that any excess overflow liquid above the predetermined desired amount is caught and saved in an overflow vessel so that the excess liquid can be added back to the primary vessel on later refills. This accomplishes two purposes, first, it saves the liquid which in the case of expensive liquids is very important from a cost standpoint, and, secondly, it eliminates any loss of liquid from the possible pollution or contamination standpoint.

Another very important feature is in the additional accurately calibrated displacement means provided as part of the over-all apparatus to permit variations in the total volume being measured so that precision measuring of volumes less than the total initial capacity of the primary measuring device may be accurately accomplished.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 2:
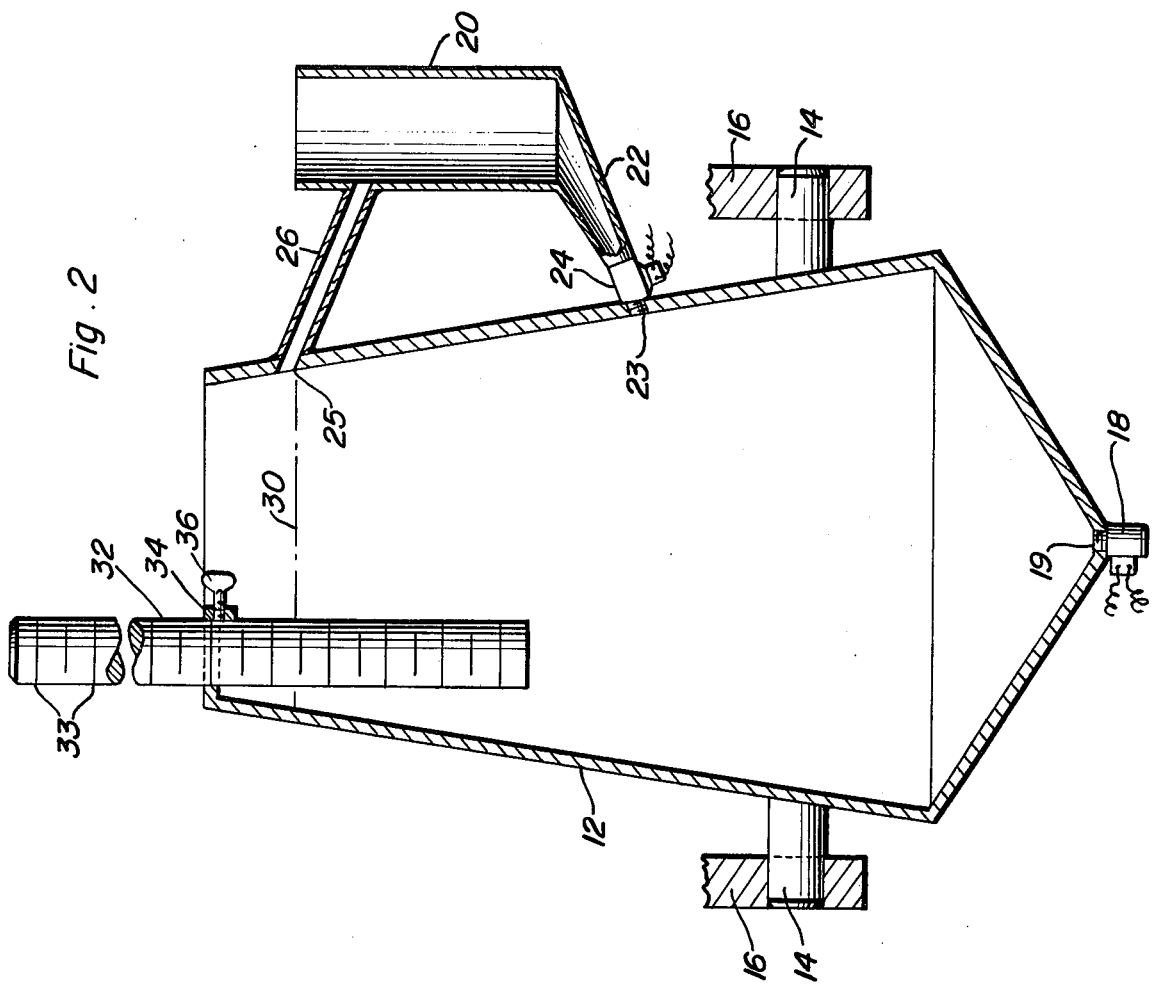
FIG. 2 is a cross-sectional view, slightly enlarged, taken across the center section of the measuring apparatus of FIG. 1.
Figure 1:
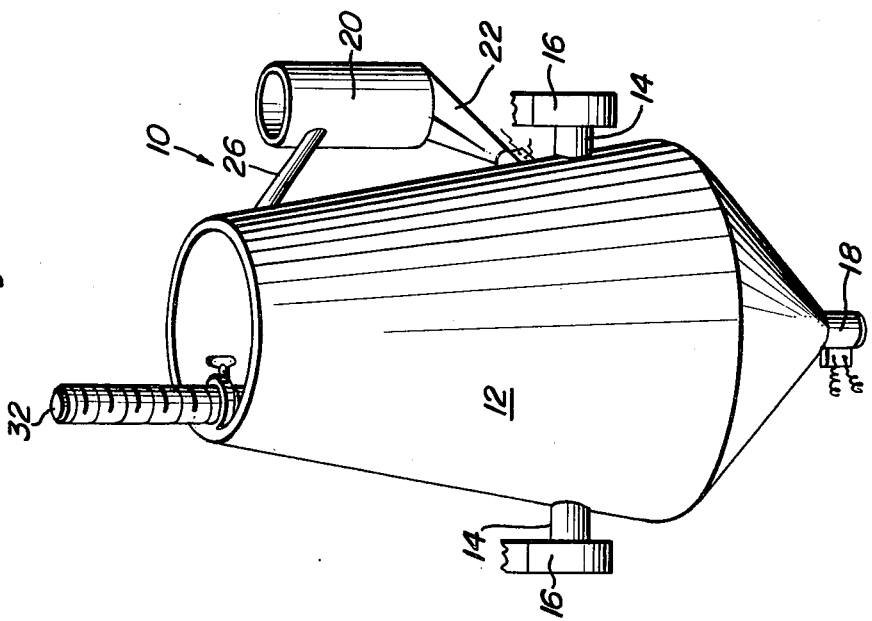
FIG. 1 is a perspective view of the precision measuring apparatus of this invention.

Referring to FIG. 1 of the drawings, reference numeral 10 indicates the precision measuring apparatus of this invention. The primary measuring vessel 12 is shaped as shown in order to accurately measure large amount of liquid and in order to contain such large volumes without rupture. Other shapes than that shown may be used, but this particular shape has been discovered as being quite strong and very practical. The primary vessel 12 is preferably suspended by pivotal structure such as the support pins 14 and trunnion supports 16. The purpose for such suspension is to permit the over-all vessel to be readily and easily dumped to empty the liquid contents thereof after the precision measuring operation has taken place.

Normally an outlet valve, such as 18, at the bottom of the vessel will also be provided. The valve 18 is an electrically operated valve which when the operator throws the proper electrical switch in a conventional electrical hookup (not shown) the valve will be opened to permit discharge of the liquid. However, it is obvious that the rate of discharge through the opening 19 in the bottom of the vessel will be much slower than in the dumping type operation.

An accurate measuring line 30 is appropriately inscribed inside the vessel to indicate when the liquid being used to fill the vessel has reached the predetermined indicated amount. A saver overflow vessel 20 is mounted onto the side of the primary vessel by supporting tubes 22 and 26. The supporting tube 22 is appropriately funnel-shaped and connected to the primary vessel by another valve 24. This valve 24 is shown as being electrically operated, but could be of any means of operation such as pneumatic, hydraulic, manual or mechanical, etc. This valve is appropriatley connected into the side of the vessel through the hole 23. The upper end of the liquid saver vessel 20 is connected to the primary vessel by the tube 26 through another hole 25 in the side of the primary vessel. The bottom edge of the hole 25 will be exactly in line with the precision measuring line 30 already described above. This is very important so that exactly when the liquid being measured exceeds the volume indicated by line 30 any excess liquid above this will automatically flow through tube 26 into the overflow vessel 20. Obviously, in order for this operation to take place in a desired and proper manner, the primary vessel 12 must be supported so that the line 30 is in an accurate level plane. This would be accomplished in the initial levelling set up of the support trunnions 16 and pivot pins 14.

The desired precision measuring capacity of the primary vessel 12 may be reduced in an accurate manner by the use of the rod 32. The rod 32 is accurately calibrated as indicated by the indicia 33 appropriately inscribed thereon. A clamping support 34 with an adjustable set screw 36 is also provided.

The adjustment turn screw 36 permits the displacement rod 32 to be accurately adjusted with an appropriate indicator line 33 aligned with the mark 30 within the primary measuring vessel 12. The clamp arrangement 34, 36 is for illustration only, and may be of many other desired configurations.

An example of how this vessel may be used is as follows: if it is desried to measure 222.5 gallons of chemical A on a regular sustained basis, the primary measuring vessel 12 would be constructed with an overflow level at the line 30 of 222.5 gallons. Upon filling the vessel when the liquid level of chemical A reaches line 30, any overflow amount above that, instead of being lost would be transferred through tubing 26 to the saving vessel 20. The valve 24 being closed, any excess liquid will be saved and stored within the tubing 22 and the vessel 20. The vessel 12 will then contain exactly 222.5 gallons which may be dispensed of by means of the valve 18 into a desired transfer means or directly to a point of application. Note that the entry point 23 for the storing and saving vessel 20 must be above the point within vessel 12 for a corresponding quantity of liquid. This is necessary so that the contents of vessel 20, when it is full, does not exceed the volume in vessel 12 at that point.

If the need arises to reduce the volume of vessel 12 less than 222.5 gallons as, for example, a reduction of 22.1 gallons or 122.1 gallons or any other reasonable amount, then rod 32, or whatever the particular displacement means is, is inserted into the clamping structure 34 so as to align the proper indicia for 22.1 gallons or 122.1 gallons in alignment with line 30 which will then displace that particular volume of liquid. More than one displacement rod may be used with the vessel 12 at the sides to achieve whatever desired reduction in volume of the vessel is necessary. These rods will be calibrated in whatever measurement is desired, either English liquid or metric measurements, depending on the user's needs or desires. The term "rod" is synonymous with tubes, squares, cubes, or other geometric shapes.

Also the degree of taper in the sides of vessel 12 may vary. Whether the top is completely open or closed will vary with special applications that might arise. If the top is closed, then any displacement rods used with the vessel would be inserted into the vessel through proper entry holes which preferably would be sealed with gaskets. Also, if the primary vessel is used by dumping the vessel about the pivot pins 14, means for closing the top of saving vessel 20 and an appropriate valve means in tube 26 would also be necessary in order to prevent any dumping of liquid which has been saved from this part of the over-all device.

The purpose of this apparatus, in whatever size and for whatever amount of liquid it is desired to measure, is the accurate volumetric measurement of liquids in quantity. This apparatus will permit the quantity measurement of great amounts of liquid speedily and quickly with a degree of accuracy never before achieved in the industry.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A precision measuring device comprising; means for accurately measuring large volumes of liquid in gallon quantities including, a first open top liquid measuring vessel, means for storing and saving any excess liquid poured into said vessel which exceeds a predetermined designated amount, means for emptying said first liquid measuring vessel of the predetermined measured amount of liquid contained therein after filling, and the means for emptying said first liquid measuring vessel including means pivotally mounting the entire apparatus so that the predetermined measured liquid may be dumped from the first liquid measuring vessel.

2. The structure as set forth in claim 1 wherein the means for storing and saving the excess liquid includes a second liquid storing open top vessel supported adjacent to the first liquid measuring vessel by means of communicating channels integral therewith.

3. The structure as set forth in claim 2 wherein the first liquid measuring vessel has a predetermined indicia line near the open top thereof for indicating the predetermined amount of liquid to be meaured and one of the communicting channels between the first and second vessels has an opening adjacent this line.

4. The structure as set forth in claim 3 wherein a means for empying said first liquid measuring vessel includes valve means at the bottom thereof.

5. The structure as set forth in claim 4 wherein the other communicating channel between the storing vessel and the first liquid measuring vessel includes a funnel-shaped transfer channel and valve means connecting said funnel-shaped channel to the first liquid measuring vessel.

6. The structure as set forth in claim 5 together with additional liquid displacement means for decreasing the predetermined amount of high gallonage liquid to be accurtely measured by the first liquid measuring vessel.

7. The structure as set forth in claim 2 together with cover means for at least one of said vessels.

8. The structure as set forth in claim 2 together with additional displacement means for decreasing the predetermined measured amount of high gallonage liquid which can be received in the first liquid measuring vessel.

9. The structure as set forth in claim 1, wherein the means for pivotally mounting to permit dumping includes trunnion supports, and support pins on the first vessel to pivotally suspend same from the trunnion supports.

10. The structure as set forth in claim 9, wherein the sides of the first open top liquid measuring vessel are tapered inwardly from adjacent the support pins to the open top.

* * * * *